United States Patent
Muppala et al.

(10) Patent No.: US 7,869,366 B1
(45) Date of Patent: Jan. 11, 2011

(54) APPLICATION-AWARE RATE CONTROL

(75) Inventors: Suresh Muppala, Cupertino, CA (US); Azeem Feroz, San Jose, CA (US)

(73) Assignee: Packeteer, Inc., Cupertino, CA (US)

( * ) Notice: Subject to any disclaimer, the term of this patent is extended or adjusted under 35 U.S.C. 154(b) by 964 days.

(21) Appl. No.: 11/726,552

(22) Filed: Mar. 22, 2007

Related U.S. Application Data

(60) Provisional application No. 60/786,815, filed on Mar. 28, 2006.

(51) Int. Cl.
*H04J 1/16* (2006.01)

(52) U.S. Cl. .................................. 370/238; 370/395.41

(58) Field of Classification Search ................. 370/231, 370/299, 235, 238, 395.41; 709/102, 238
See application file for complete search history.

(56) References Cited

U.S. PATENT DOCUMENTS

| | | | |
|---|---|---|---|
| 5,042,029 A | 8/1991 | Hayakawa | |
| 5,193,151 A | 3/1993 | Jain | |
| 5,251,152 A | 10/1993 | Notess | |
| 5,359,593 A | 10/1994 | Derby | |
| 5,426,635 A | 6/1995 | Mitra | |
| 5,455,826 A | 10/1995 | Ozveren | |
| 5,495,426 A | 2/1996 | Waclawsky | |
| 5,802,106 A | 9/1998 | Packer | |
| 5,838,919 A | 11/1998 | Schwaller | |
| 5,870,561 A | 2/1999 | Jarvis | |
| 5,923,849 A | 7/1999 | Venkatraman | |
| 6,018,516 A | 1/2000 | Packer | |
| 6,038,216 A | 3/2000 | Packer | |
| 6,046,980 A | 4/2000 | Packer | |
| 6,047,322 A | 4/2000 | Vaid | |
| 6,075,791 A | 6/2000 | Chiussi | |
| 6,115,357 A | 9/2000 | Packer | |
| 6,119,235 A | 9/2000 | Vaid | |
| 6,178,448 B1 | 1/2001 | Gray | |
| 6,182,120 B1 * | 1/2001 | Beaulieu et al. | ............. 709/207 |
| 6,198,722 B1 | 3/2001 | Bunch | |
| 6,205,120 B1 | 3/2001 | Packer | |
| 6,215,769 B1 | 4/2001 | Ghani | |

(Continued)

OTHER PUBLICATIONS

Balakrishnan, H., et al., "Improving TCP/IP Performance Over Wireless Networks", Proc. of 1.sup.st. AMC Conf. on Mobile Computing and Networking, Berkeley, CA, pp. 1-10 (Nov. 1995).

(Continued)

*Primary Examiner*—Brenda Pham
(74) *Attorney, Agent, or Firm*—Baker Botts L.L.P.

(57) ABSTRACT

A method for controlling data rate at an application layer. The method, in a particular implementation, includes identifying an application-layer message corresponding to a network application, wherein the application-layer message is transmitted in a first direction from a first host to a remote host and is operable to cause the remote host to transmit one or more responsive messages to the first host. A queuing delay is computed for the application-layer message and transmission of the application-layer message across a link to the remote host is delayed according to the queuing delay wherein the computed queuing delay is based at least in part on utilization of the link in a direction opposite the first direction of network traffic corresponding to the network application.

9 Claims, 6 Drawing Sheets

U.S. PATENT DOCUMENTS

| | | | |
|---|---|---|---|
| 6,256,317 | B1 | 7/2001 | Holloway |
| 6,272,131 | B1 | 8/2001 | Ofek |
| 6,285,658 | B1 | 9/2001 | Packer |
| 6,298,041 | B1 | 10/2001 | Packer |
| 6,442,139 | B1* | 8/2002 | Hosein ................. 370/236 |
| 6,560,243 | B1 | 5/2003 | Mogul |
| 6,894,974 | B1 | 5/2005 | Aweva |
| 6,928,052 | B2 | 8/2005 | Packer |
| 6,957,267 | B2 | 10/2005 | Awasthi |
| 7,088,677 | B1* | 8/2006 | Burst, Jr. ................. 370/229 |
| 7,400,578 | B2* | 7/2008 | Guthrie et al. ............ 370/229 |
| 2002/0159396 | A1 | 10/2002 | Carlson |
| 2002/0172153 | A1 | 11/2002 | Vernon |
| 2003/0097461 | A1 | 5/2003 | Barham |
| 2005/0018617 | A1* | 1/2005 | Jin et al. ................. 370/252 |

OTHER PUBLICATIONS

Gong et al., "Study of a two level flow control scheme and buffering Strategies", INFOCOM '94 Networking for Global Communications, 13 .sup.th Proceedings IEEE (94CH3401-7), vol. 3, pp. 1124-1233 (Jun. 1994).

"10 Protocol Layering", TCP/IP, vol. 1, pp. 139-144 (1991).

RFC 793, "Transmission Control Protocol—DARPA Internet Program Protocol Specification", Postel, ed., pp. 1-87 (1981).

RFC 1122, "Requirements for Internet Hosts", Branden, ed., pp. 1-116 (1989).

Roberts, L. G., "Explicit Rate Flow Control", lroberts@ziplink.net;http://www.ziplink.net/lroberts/Ex...ate/ Explicit-Rate-Flow-Control.htm, pp. 1-14 (Apr. 1997).

Thomas. S.A., "IPng and the TCP/IP Protocols", John Wiley & Sons, Inc., pp. 239-240, 1996.

"20.3 Sliding Windows", TCP/IP Illustrated, vol. 1, pp. 280-284 (1991).

"TCP: Flow Control and Adaptive Retransmission", TCP/IP, vol. II, pp. 261-283 (1991).

"2.5 The Idea Behind Sliding Windows", TCP/IP, vol. 1, pp. 175-177 (1991).

"12.10 Variable Window Size and Flow Control", TCP/IP, vol. 1, pp. 182-194 (1991).

Comer et al., "A Rate-Based Congestion Avoidance and Control Scheme for Packet Switched Networks," 10th Int'l Conference on Distributed Computing Systems, IEEE Computer Society Press, Los Alomitos CA (1990).

Dighe et al., "Congestion Avoidance Strategies in Broadband Packet Networks," Proceedings vol. 1, IEEE Infocom '91 (1991).

Finn Arve Aagesen, "A Flow Management Architecture for B-ISDN," Integrated Broadband Communication Networks and Services (1993).

Chakrabarti et al., "Adaptive Control for Packet Video," Proceedings of the Int'l Conference on Multimedia Computing and Systems, IEEE Computer Society Press (1994).

Bolot et al., "A Rate Control Mechanism for Packet Video in the Internet," Proceedings vol. 3, IEEE Infocom '94, IEEE Computer Society Press (1994).

Hong et al., "Performance Evaluation of Connectionless Packet Service for ATM Networks," Proceedings IEEE Global Telecommunications Conference (Globecom '95) (1995).

Kanakia et al., "An Adaptive Congestion Control Scheme for Real-Time Packet Video Transport," SIGCOMM'93 Conference Proceedings, Computer Communication Review (1993).

Song et al., "An Algorithm for Flow and Rate Control of XTP," Technical Program Conference Record vol. 1/3, IEEE Int'l Conference on Communications '93 (1993).

Gerla et al., "Comparing ATM Credit-Based and Rate-Based Controls for TCP Sources," MILCOM 95, Univesal Communications, Conference Record, IEEE, Part vol. 1, 1995, pp. 6-10 vol. 1 New York, NY.

V. Jacobson. Congestion avoidance and control. In ACM SIGCOMM '88, vol. 18, 4, pp. 314-329 (1988).

Huynh et al. Performance Comparison Between TCP Slow-Start and a New Adaptive Rate-Based Congestion Avoidance Scheme. Proceedings of the 2nd Int'l Workshop on Modeling, Analysis, and Simulation of Computer and Telecommunications Systems, IEEE 1994.

Zygmunt Haas. Adaptive Admission Congestion Avoidance Control. Computer Communications Review, vol. 21, No. 5, pp. 58-76. ACM SIGCOMM, 1991.

Ramakrishnan et al. A Binary Feedback Scheme for Congestion Avoidance in Computer Networks. ACM Transactions on Computer Systems, vol. 8, No. 2, pp. 158-181. May 1990.

Choi et al. On Acknowledgment Schemes of Sliding Window Flow Control. IEEE Transactions on Communication, vol. 37, No. 11 (1989).

Huan-Yun Wei; TcpMasq—"Active Bandwidth Management System" Open Source; URL http://www.cis.nctu.edu.tw/~gis87517; Pointer = Publication as of May 8, 2002.

* cited by examiner

APPLICATION-AWARE RATE CONTROL

CROSS-REFERENCE TO RELATED APPLICATIONS

The present application claims priority to U.S. Provisional Application Ser. No. 60/786,815 filed Mar. 28, 2006.

This application also makes reference to the following commonly owned U.S. patent applications, which are herein incorporated in their entirety for all purposes:

U.S. patent application Ser. No. 08/762,828 now U.S. Pat. No. 5,802,106 in the name of Robert L. Packer, entitled "Method for Rapid Data Rate Detection in a Packet Communication Environment Without Data Rate Supervision;"

U.S. patent application Ser. No. 08/970,693 now U.S. Pat. No. 6,018,516, in the name of Robert L. Packer, entitled "Method for Minimizing Unneeded Retransmission of Packets in a Packet Communication Environment Supporting a Plurality of Data Link Rates;"

U.S. patent application Ser. No. 08/742,994 now U.S. Pat. No. 6,038,216, in the name of Robert L. Packer, entitled "Method for Explicit Data Rate Control in a Packet Communication Environment without Data Rate Supervision;"

U.S. patent application Ser. No. 09/977,642 now U.S. Pat. No. 6,046,980, in the name of Robert L. Packer, entitled "System for Managing Flow Bandwidth Utilization at Network, Transport and Application Layers in Store and Forward Network;"

U.S. patent application Ser. No. 09/166,924 now U.S. Pat. No. 6,115,357, in the name of Robert L. Packer and Brett D. Galloway, entitled "Method for Pacing Data Flow in a Packet-based Network;"

U.S. patent application Ser. No. 09/046,776 now U.S. Pat. No. 6,205,120, in the name of Robert L. Packer and Guy Riddle, entitled "Method for Transparently Determining and Setting an Optimal Minimum Required TCP Window Size;"

U.S. patent application Ser. No. 09/479,356 now U.S. Pat. No. 6,285,658, in the name of Robert L. Packer, entitled "System for Managing Flow Bandwidth Utilization at Network, Transport and Application Layers in Store and Forward Network;"

U.S. patent application Ser. No. 09/198,090 now U.S. Pat. No. 6,412,000, in the name of Guy Riddle and Robert L. Packer, entitled "Method for Automatically Classifying Traffic in a Packet Communications Network;"

U.S. patent application Ser. No. 09/198,051, in the name of Guy Riddle, entitled "Method for Automatically Determining a Traffic Policy in a Packet Communications Network;"

U.S. patent application Ser. No. 09/206,772, now U.S. Pat. No. 6,456,360, in the name of Robert L. Packer, Brett D. Galloway and Ted Thi, entitled "Method for Data Rate Control for Heterogeneous or Peer Internetworking;"

U.S. patent application Ser. No. 09/710,442, in the name of Todd Krautkremer and Guy Riddle, entitled "Application Service Level Mediation and Method of Using the Same;"

U.S. patent application Ser. No. 09/966,538, in the name of Guy Riddle, entitled "Dynamic Partitioning of Network Resources;"

U.S. patent application Ser. No. 10/015,826 in the name of Guy Riddle, entitled "Dynamic Tunnel Probing in a Communications Network;"

U.S. patent application Ser. No. 10/108,085, in the name of Wei-Lung Lai, Jon Eric Okholm, and Michael J. Quinn, entitled "Output Scheduling Data Structure Facilitating Hierarchical Network Resource Allocation Scheme;"

U.S. patent application Ser. No. 10/178,617, in the name of Robert E. Purvy, entitled "Methods, Apparatuses and Systems Facilitating Analysis of Network Device Performance;"

U.S. patent application Ser. No. 10/155,936 now U.S. Pat. No. 6,591,299, in the name of Guy Riddle, Robert L. Packer, and Mark Hill, entitled "Method For Automatically Classifying Traffic With Enhanced Hierarchy In A Packet Communications Network;"

U.S. patent application Ser. No. 10/236,149, in the name of Brett Galloway and George Powers, entitled "Classification Data Structure enabling Multi-Dimensional Network Traffic Classification and Control Schemes;"

U.S. patent application Ser. No. 10/334,467, in the name of Mark Hill, entitled "Methods, Apparatuses and Systems Facilitating Analysis of the Performance of Network Traffic Classification Configurations;"

U.S. patent application Ser. No. 10/453,345, in the name of Scott Hankins, Michael R. Morford, and Michael J. Quinn, entitled "Flow-Based Packet Capture;"

U.S. patent application Ser. No. 10/676,383 in the name of Guy Riddle, entitled "Enhanced Flow Data Records Including Traffic Type Data;"

U.S. patent application Ser. No. 10/720,329, in the name of Weng-Chin Yung, Mark Hill and Anne Cesa Klein, entitled "Heuristic Behavior Pattern Matching of Data Flows in Enhanced Network Traffic Classification;"

U.S. patent application Ser. No. 10/843,185 in the name of Guy Riddle, Curtis Vance Bradford and Maddie Cheng, entitled "Packet Load Shedding;"

U.S. patent application Ser. No. 10/938,435 in the name of Guy Riddle, entitled "Classification and Management of Network Traffic Based on Attributes Orthogonal to Explicit Packet Attributes;" and U.S. patent application Ser. No. 11/027,744 in the name of Mark Urban, entitled "Adaptive Correlation of Service Level Agreement and Network Application Performance."

BACKGROUND

Transport layer protocols, such as TCP, utilize acknowledgement packets to present and use window sizes for flow control rate control. The attributes of the TCP and similar protocols allows for explicit inbound rate control, as disclosed in U.S. Pat. No. 6,038,216, by delaying acknowledgement packets and/or modifying sequence numbers and/or advertised window size. However, various non-TCP protocols (such as the User Datagram Protocol (UDP)) generally do not allow for inbound rate control as they do not have flow control mechanisms via modification or delay of acknowledgement packets or other similar mechanisms. As a result, there is generally no opportunity, for non-TCP protocols, to affect the rate of incoming packets via an allocated bandwidth/window size.

With increasing use of non-TCP protocols, overall inbound rate control, for example—in a network that has TCP and non-TCP traffic, is proving to be challenging as nothing exists in the art for effective inbound rate control for those non-TCP protocols.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated.

An embodiment by way of non-limiting example provides for a method for controlling inbound data rate at an application layer. The method includes identifying an application-layer message corresponding to a network application, wherein the application-layer message is transmitted in a first direction from a first host to a remote host and is operable to cause the remote host to transmit one or more responsive messages to the first host. A queuing delay is computed for the application-layer message and transmission of the application-layer message across a link to the remote host is delayed according to the queuing delay wherein the computed queuing delay is based at least in part on utilization of the link in a direction opposite the first direction of network traffic corresponding to the network application.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be considered illustrative rather than limiting.

DETAILED DESCRIPTION

The following embodiments and aspects thereof are described and illustrated in conjunction with systems, apparatuses and methods which are meant to be exemplary and illustrative, not limiting in scope.

The claimed embodiments contemplate systems, apparatuses and methods for implementing inbound rate control. For some applications, an outgoing message (embodied in a packet or series of packets), for example a search query or a message transmitted between peers in a peer-to-peer file sharing application, will often result in a large amount of data/packets being returned to the client that initiated the message. In some situations, it may be desirable to delay delivery of that inbound data. Since many network applications typically do not use reliable transport protocols, such as TCP using ACKs, ACK-based rate control is not available. In order to achieve inbound rate control for such applications, the claimed embodiments are operative to delay delivery of application-related packets in one direction to control the rate or flow of packets in the opposite direction. As a result of the delay, inbound rate control can be achieved as delivery of incoming packets is controlled, in part, by delaying delivery of the outgoing packet(s) that results in delivery of the incoming data. While the claimed embodiments will generally be described in terms of inbound rate control, it should be understood that those claimed embodiments can also be implemented on inbound traffic in order to affect outbound rate control. Furthermore, it should be additionally understood that while the claimed embodiments are described in relation to applications that do not employ ACKs, the claimed embodiments can also be implemented in connection with network applications that use reliable transport protocols, such as TCP or other protocols that utilize ACKs.

Figure 1:
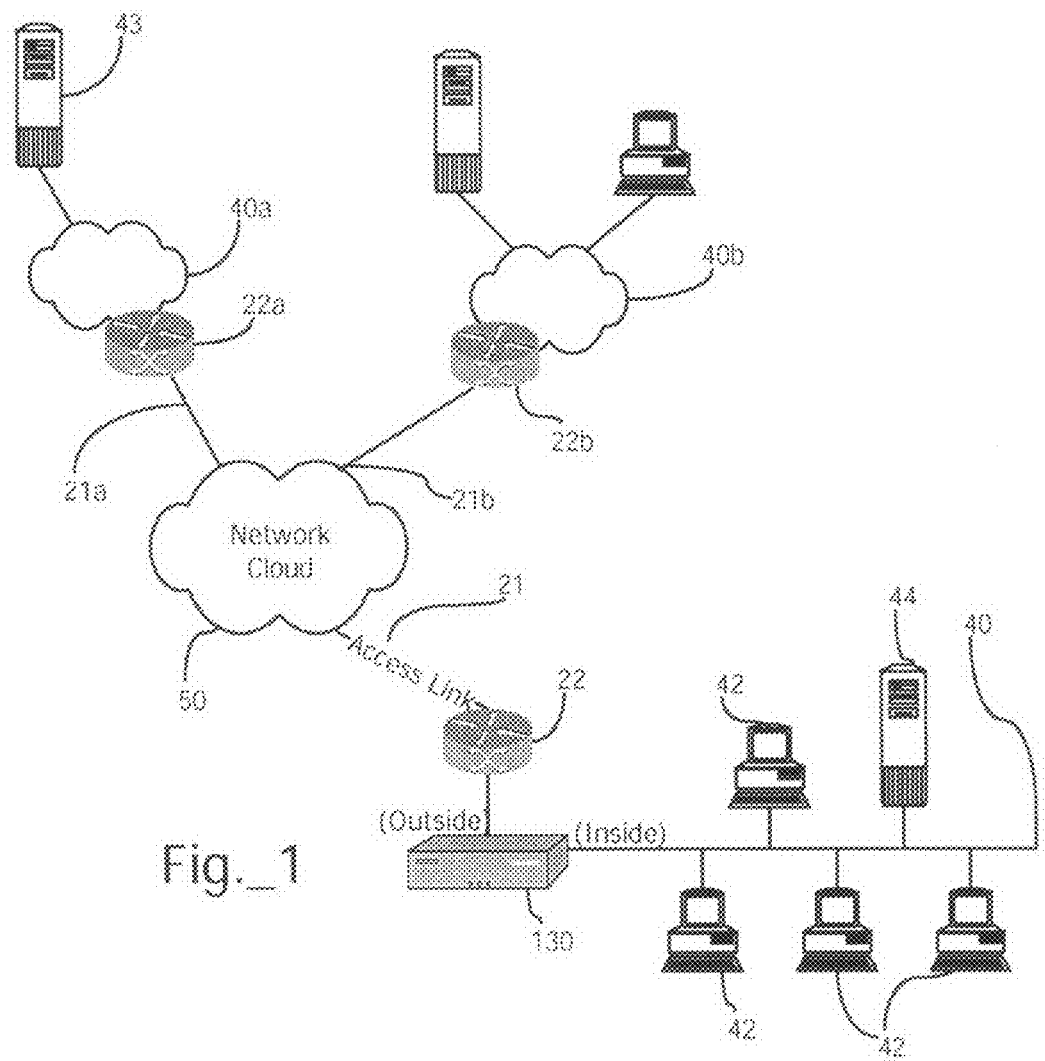
FIG. 1 is a functional block diagram illustrating a computer network system architecture in which aspects of the claimed embodiments may operate.

Before the claimed embodiments are detailed, FIGS. 1-2 will first be described in order to convey a full understanding and appreciation of those claimed embodiments. FIG. 1 illustrates an exemplary network environment in which the claimed embodiments may operate. Of course, the claimed embodiments can be applied to a variety of network architectures. FIG. 1 illustrates, for didactic purposes, a network 50, such as a wide area network, interconnecting a first network 40, supporting a central operating or headquarters facility (for example), and a second network 40a, supporting a branch office facility (for example). Network 50 may also be operably connected to other networks, such as network 40b, associated with the same administrative domain as networks 40, 40a, or a different administrative domain. As FIG. 1 indicates, the first network 40 interconnects several TCP/IP end systems, including client devices 42 and server device 44, and provides access to resources operably connected to computer network 50 via router 22 and access link 21. Access link 21 is a physical and/or logical connection between two networks, such as computer network 50 and network 40. The computer network environment, including network 40 and network 50 is a packet-based communications environment, employing TCP/IP protocols (for example), and/or other suitable protocols, and has a plurality of interconnected digital packet transmission stations or routing nodes. First network 40, and networks 40a & 40b, can each be a local area network, a wide area network, combinations thereof, or any other suitable network. As FIG. 1 illustrates, application traffic management device 130, in one implementation, is deployed at the edge of network 40. As used herein, inbound generally refers to packets transmitted to network 40, while outbound generally refers to packets transmitted from network 40. In another implementation, device 130 may be contained in router 22. As discussed more fully below, application traffic management device 130 is operative to classify and manage data flows traversing access link 21. In one implementation, application traffic management device 130 also includes functionality operative to monitor the performance of the network (such as network latency) and/or network applications.

Figure 2:
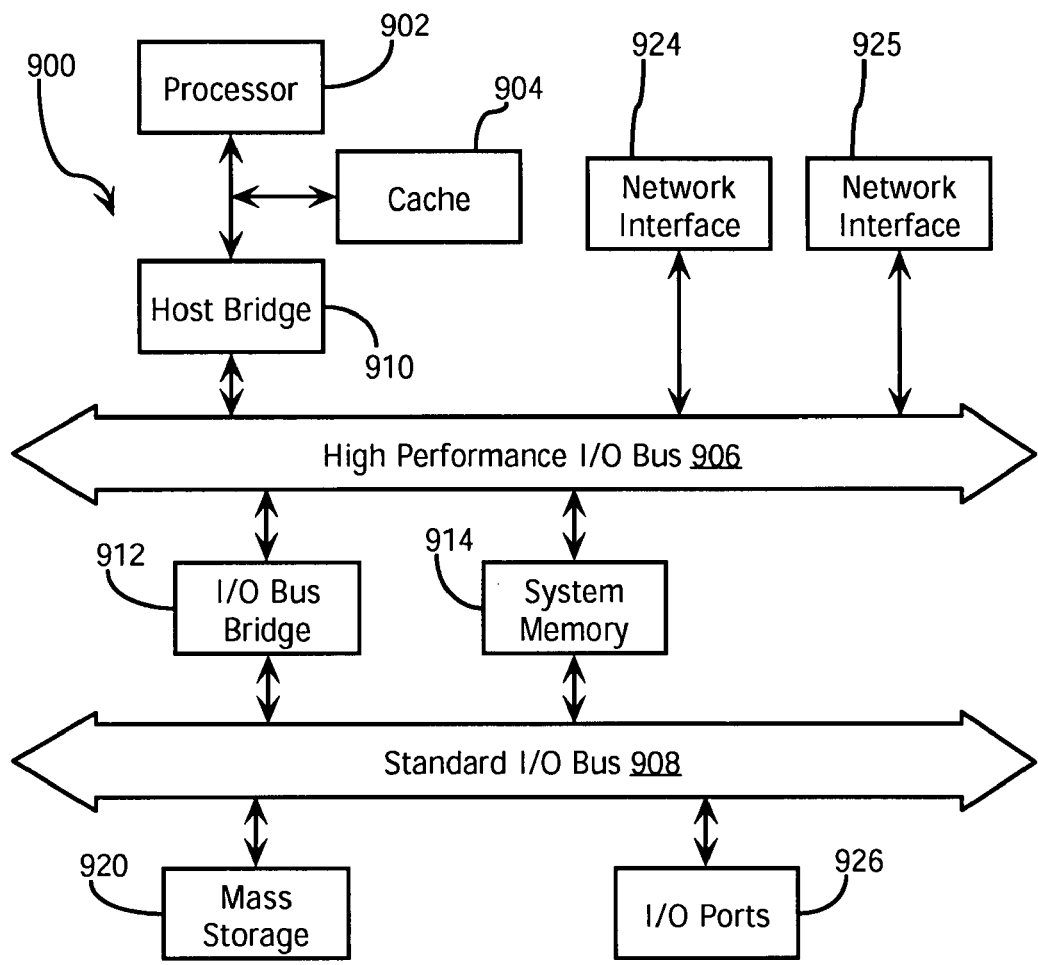
FIG. 2 is a functional block diagram illustrating the hardware components of a network application traffic management device, in accordance with an exemplary embodiment.

FIG. 2 illustrates for didactic purposes an example computing platform, and hardware architecture, for network traffic management device 130. In one implementation, network traffic management device 130 comprises a processor 902, a system memory 914, network interfaces 924 & 925, and one or more software applications (including network device application 75 shown in FIG. 2) and drivers enabling the functions described herein.

The claimed embodiments can be implemented on a wide variety of computer system architectures. For example, FIG. 2 illustrates, hardware system 900 having components suitable for network traffic management device 130 in accordance with one implementation of the claimed embodiments.

In the illustrated embodiment, the hardware system 900 includes processor 902 and a cache memory 904 coupled to each other as shown. Additionally, the hardware system 900 includes a high performance input/output (I/O) bus 906 and a standard I/O bus 908. Host bridge 910 couples processor 902 to high performance I/O bus 906, whereas I/O bus bridge 912 couples the two buses 906 and 908 to each other. Coupled to bus 906 are network/communication interfaces 924 and 925, and system memory 914. The hardware system may further include video memory (not shown) and a display device coupled to the video memory. Coupled to bus 908 are mass storage 920 and I/O ports 926. The hardware system may optionally include a keyboard and pointing device (not shown) coupled to bus 908. Collectively, these elements are intended to represent a broad category of computer hardware systems, including but not limited to general purpose computer systems based on the Pentium® processor manufactured by Intel Corporation of Santa Clara, Calif., as well as any other suitable processor.

The elements of computer hardware system 900, according to one implementation, are described below. In particular, network interfaces 924, 925 are used to provide communication between system 900 and any of a wide range of networks, such as an Ethernet (e.g., IEEE 802.3) network, etc. Mass storage 920 is used to provide permanent storage for the data and programming instructions to perform the above described functions implemented in the system controller, whereas system memory 914 (e.g., DRAM) is used to provide temporary storage for the data and programming instructions when executed by processor 902. I/O ports 926 are one or more serial and/or parallel communication ports used to provide communication between additional peripheral devices, which may be coupled to hardware system 900.

Hardware system 900 may include a variety of system architectures, and various components of hardware system 900 may be rearranged. For example, cache 904 may be on-chip with processor 902. Alternatively, cache 904 and processor 902 may be packed together as a "processor module," with processor 902 being referred to as the "processor core." Furthermore, certain implementations of the claimed embodiments may not require nor include all of the above components. For example, the peripheral devices shown coupled to standard I/O bus 908 may be coupled to high performance I/O bus 906. In addition, in some implementations only a single bus may exist with the components of hardware system 900 being coupled to the single bus. Furthermore, additional components may be included in system 900, such as additional processors, storage devices, or memories.

As discussed above, in one embodiment, the operations of the network traffic management device 130 described herein are implemented as a series of software routines run by hardware system 900. These software routines comprise a plurality or series of instructions to be executed by a processor in a hardware system, such as processor 902. Initially, the series of instructions are stored on a storage device, such as mass storage 920. However, the series of instructions can be stored on any conventional storage medium, such as a diskette, CD-ROM, ROM, etc. Furthermore, the series of instructions need not be stored locally, and could be received from a remote storage device, such as a server on a network, via network/communication interface 924. The instructions are copied from the storage device, such as mass storage 920, into memory 914 and then accessed and executed by processor 902. Still further, the functions described herein can also be implemented, in whole or in part, by firmware or hardware logic circuits.

An operating system manages and controls the operation of system 900, including the input and output of data to and from software applications (not shown). The operating system provides an interface between the software applications being executed on the system and the hardware components of the system. According to one embodiment of the claimed embodiments, the operating system is the Windows® 95/98/NT/XP operating system, available from Microsoft Corporation of Redmond, Wash. However, the claimed embodiments may be used with other conventional operating systems, such as the Apple Macintosh Operating System, available from Apple Computer Inc. of Cupertino, Calif., UNIX operating systems, LINUX operating systems, and the like. Of course, other implementations are possible. For example, the functionality of network traffic management device 130 may be implemented by a plurality of server blades communicating over a backplane.

Figure 3:
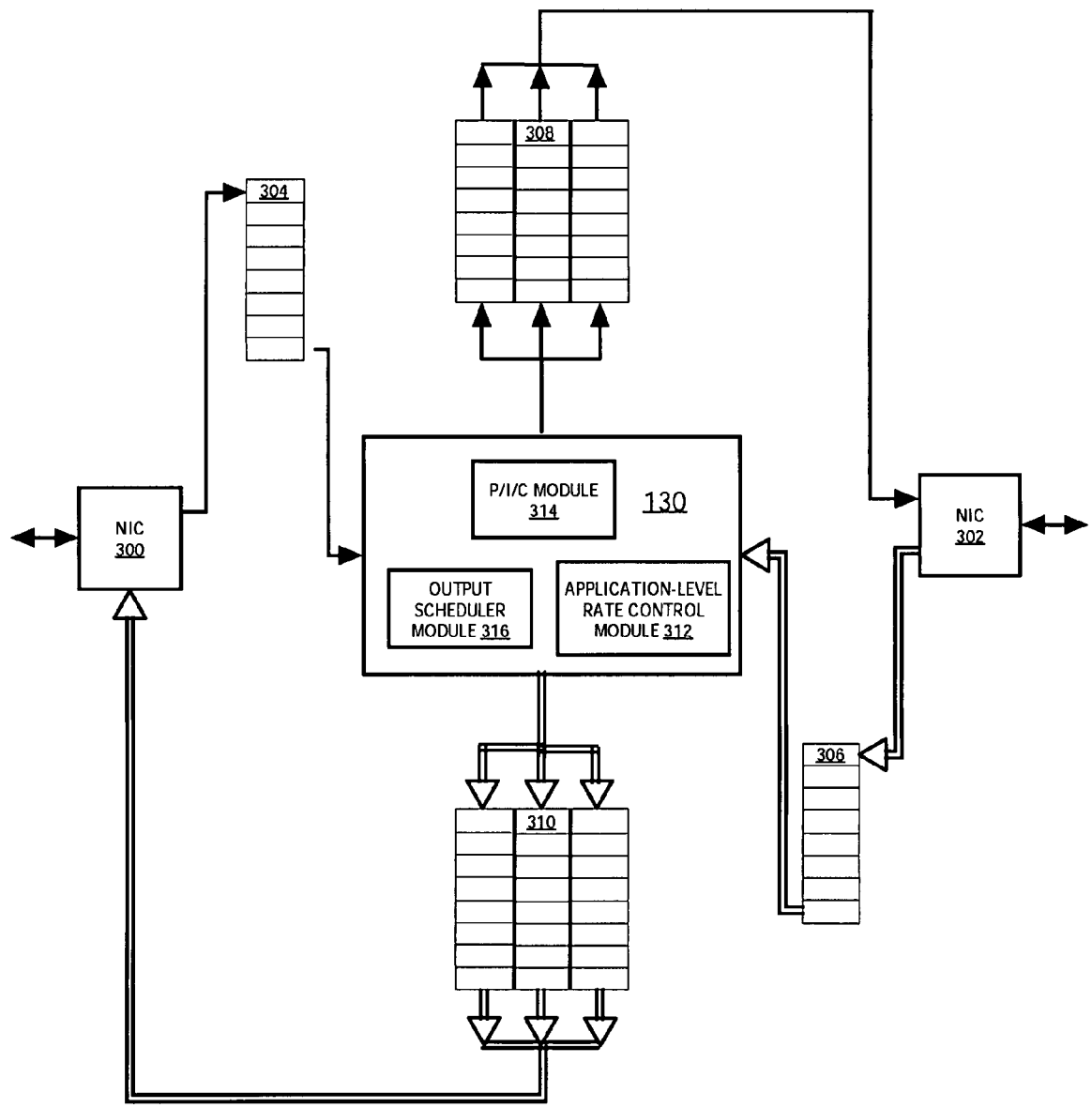
FIG. 3 is a functional block diagram illustrating the functionality of a network application traffic management device, in accordance with an exemplary embodiment.

With the completion of the description of FIGS. 1-2, several example embodiments will now be presented. To that end, FIG. 3 is a functional block diagram illustrating the functionality of a network application traffic management device 130, for example—device 130 of FIG. 2, and associated structures in accordance with an exemplary embodiment. The device 130 is operative to inspect and classify packets, place the packets into select scheduling queues based on the classification and control the flow of packets from device 130 in both the inbound and outbound directions. Application rate control module 130, in one implementation, is further divided into a process/inspect/classify (P/I/C) module 314, an output scheduler module 316 and an application-level rate control module 312. In some implementations, however, P/I/C module 314 may be divided into separate modules.

NIC 300 and NIC 302 operatively connect device 130 to the communications path between network 40 and network 50. NIC 300 forwards packets transmitted by remote nodes connected to network 40 to processing queue 304. P/I/C module 314 reads packets from processing queue 304, inspects the incoming packets and applies one or more rules to find one or more policies to apply to the packet. Classifying packets can take a number of forms. For example, packets can be classified by type of network application, user class, source and destination address, etc. In one implementation, packets related to specific network applications are specifically singled out for application-level rate control processing. Furthermore, after a sufficient number of packets in a flow have been encountered for purposes of classification, the remaining packets in the flow can be classified simply by their association to the classified data flow. After classification, output scheduler module 316 places classified packets onto one of the scheduling queues 308 based on the determined classification. More specifically, application-level rate control module 312 decides onto which scheduling queue 308 to place the packet. A separate process of application-level rate control module 312 arbitrates among the scheduling queues 308 to control the flow of packets transmitted from NIC 302. As discussed in more detail below, if a packet is a control message (such as a request message) and corresponds to a select network application, application-level rate control module 312 may assign a delivery delay to the packet. As discussed below, the delivery delay, in one implementation, is based on the number of packets, or an amount of data, stored in one of the scheduling queues 310. The scheduling queues 310 buffer packets to be transmitted in the direction opposite of those in scheduling queue 308. The packets are sent to output queue 308 with an indication of the delivery delay. When the delivery delay expires for a packet, the packet is forwarded to NIC 302 for delivery from network device 130 to a destination node (not shown). In one implementation, each queue of the scheduling queues (308 or 310) corresponds to a specific network application or group of network applications. Accordingly, a delivery delay for a given packet, in one implementation, is based on the state of the scheduling queue corresponding to the network application identified for the packet during classification.

Network device 130 can also perform the above-described process in an opposite or second direction for inbound traffic to affect outbound rate control. That is, incoming packets are processed through NIC 302, queue 306 and application rate control module 312 such that packets are classified, assigned a delivery delay and sent to particular queues of queues 310. When the delivery delay expires, packets are passed to NIC 300 and forwarded to respective destination nodes. In this embodiment, the delivery delay is based on an amount of packets buffered in one of the scheduling queues 308.

While scheduling queues 308 and 310 are each depicted as having three separate queues, it should be understood that this is merely illustrative and is meant to imply that there will typically be multiple queues. However, in some implementations, there could be just one scheduling queue at either 308 or 310.

Figure 4:
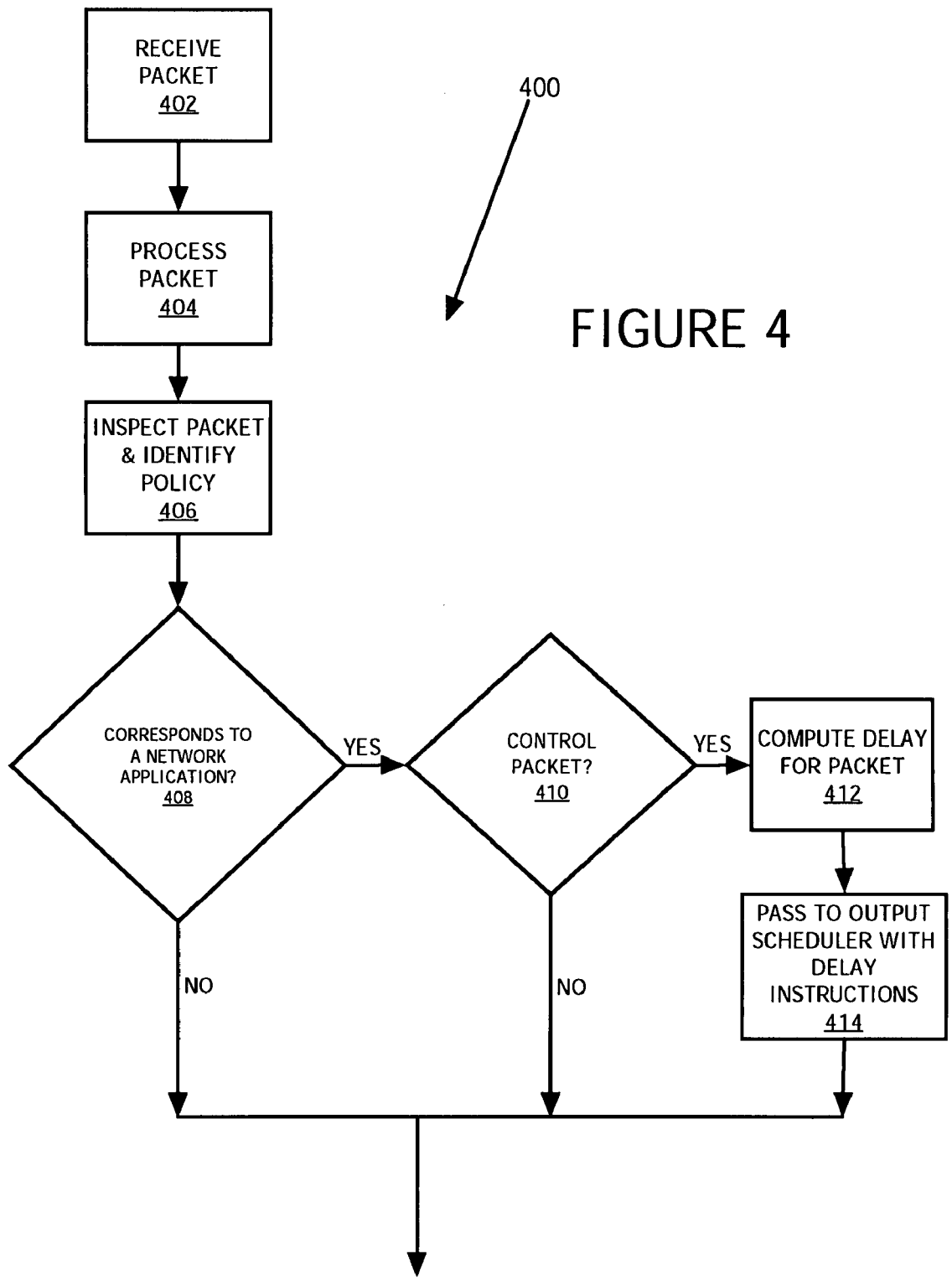
FIG. 4 is a flow chart diagram illustrating a method for delaying a control packet, in accordance with an exemplary embodiment.

To more fully describe the functions of network device 130, several flow chart diagrams illustrating example methods executed by network device 130 will be described. FIG. 4 is a flow chart diagram illustrating a method 400 for delaying a control packet, in accordance with an exemplary embodiment.

Method 400 describes receiving and processing a packet at network device 130 and determining if the packet corresponds to a network classification and if it is a control packet, via P/I/C module 314. A control packet is a type of packet that results in one or more responses from a remote server, such as an HTTP GET request. For that reason, the control packet may be delayed in order to maintain inbound rate control. If it is a control packet, application-level rate control module 312 assigns a delivery delay to the packet and output scheduler module 316 forwards the packet to a scheduling queue 308.

Regarding control packets, control packets, in one implementation, may be identified via classification. Classification provides application related details of the network traffic to control. Those details can be used in turn to control the rate of corresponding packets to achieve desired results. Even if network application information (for example, a search request or response) of a packet cannot be ascertained, some categorization can still occur. For example, with the help of port numbers and/or which host initiated a flow, it may be possible to identify a client and server. With this knowledge, pacing packets transmitted from the client can be implemented to achieve rate control of packets transmitted from the server in response.

Initially, NIC 300 receives a packet (402) and reads pointer to the packet onto queue 304 for processing (404). In one implementation, packets received at network interfaces 300 and 302 are read into packet buffer space—a memory space, typically in dynamic random access memory (DRAM), reserved for packets traversing network device 130. In one implementation, a Direct Memory Access (DMA) Controller facilitates reading of received packets into memory without substantial involvement of hardware central processing resources. U.S. application Ser. No. 10/843,185 provides a description of the operation of various modules (according to one possible implementation of the claimed embodiments), such as network interface drivers, and data structures for receiving into memory and processing packets encountered at network interfaces 138. In one embodiment, the packets are stored in the packet buffer with a wrapper including various fields reserved for packet attributes (such as source address, destination address, protocol identifiers, port identifiers, transport layer headers, VLAN tags, MPLS tags, diffsery markings, etc.), meta data (such as the time the packet was received, the packet flow direction (inbound or outbound)), and one or more pointers to data structures or objects (e.g., a flow object corresponding to the flow of which the packet is a part). In turn, module 314 reads the packet from queue 304 and parses the packet to populate the wrapper, inspects the packet to determine a network application and identify a policy (if any) that may include a rate control policy (406). If the packet does not correspond to a network application, or a network application for the flow of which the packet is a part has not been identified (408), the packet is forwarded for other processing. If yes (408), the P/I/C module 314 determines if the packet is a control packet (410). As previously indicated, a control packet is a packet that results in a response from a server if the packet is delivered to the server. Recognition of a control packet may depend on the network application, as the attributes of a control packet generally varies with network application type. Accordingly, with identification of the network application the P/I/C module 314 may apply classification or identification rules associated with the network application to identify the packet. If the packet is not a control packet, then the P/I/C module 314 forwards the packet for other processing. Otherwise, the P/I/C module 314 forwards the packet to application-level control module 312. Module 312 computes a delay for the packet (412) and passes the packet to the output scheduler module 316 (414). Output scheduler module 316 determines on which scheduling queue 308 to enqueue the packet.

Figure 5:
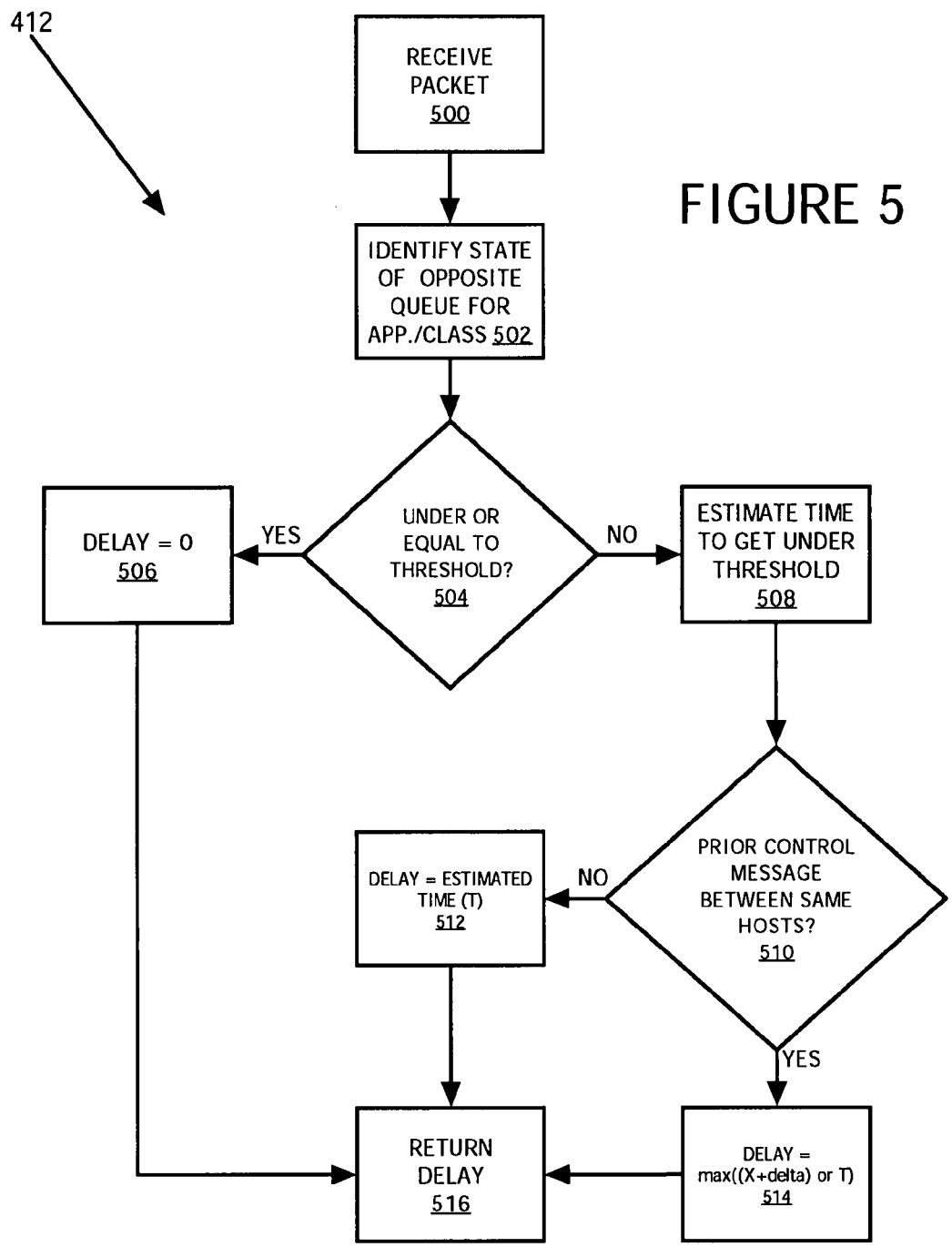
FIG. 5 is a flow chart diagram further illustrating the method of FIG. 4 for delaying a control packet, in accordance with an exemplary embodiment.

FIG. 5 details a method for how the application-level rate control module 312 computes the packet delay (412), in accordance with an exemplary embodiment. In one implementation, for packets transmitted between hosts in one direction (such as the outbound direction), module 312 looks at the state of a scheduling queue 310 corresponding to network traffic flowing in the opposite direction (such as the inbound direction) traffic. Based on the state of the scheduling queue 310 buffering network traffic in the opposite direction, module 312 then calculates a time delay based on the amount of data, or number of packets, stored in the scheduling queue 310. In one implementation, the time delay computation is also based a threshold of an amount of packets in the queue 310. The actual amount of packets in the queue 310, or queue 308, is referred to as the queue depth. As discussed above, the scheduling or delay decision can be based on the state of a queue specific to the network application, or to the scheduling queues in the aggregate.

For the outbound packet direction, for example, module 312 receives a packet (500) and identifies a queue depth at a queue 310 (502). If the queue depth is equal to or below a threshold (504), then module 312 assigns no delay to the packet. Otherwise, module 312 estimates an amount of time for the queue depth to go under the threshold (510). The amount of time, in one implementation, is based on the amount of data in the scheduling queue 310 that exceeds the threshold divided by the bandwidth or rate allocated to that scheduling queue 310. Next, module 312 determines if a prior control packet between the same hosts as the current control packet is currently being buffered by the device 130. This determination is performed to prevent a situation where transmission of the current control packet between two hosts occurs prior to a previous control packet between the same hosts. This determination may result in an alternative delay for the current control packet as opposed to assigning a time delay (T) equal to the delay for the queue depth (512) of queue 310 to fall below the threshold.

If a prior control packet corresponds to the same hosts as the current control packet (510), then module 312 assigns the time delay of either the maximum of T or an expected transit time of the previous control packet (X) plus a delta (514). After any one of operations 506, 512 or 514, module 312 returns the calculated delay (516), which is used by output scheduler module 316 to delay transmission of the packet. The delta value can be any suitable value, such as 1 microsecond. In one implementation, the delta value is a user configurable parameter.

Figure 6:
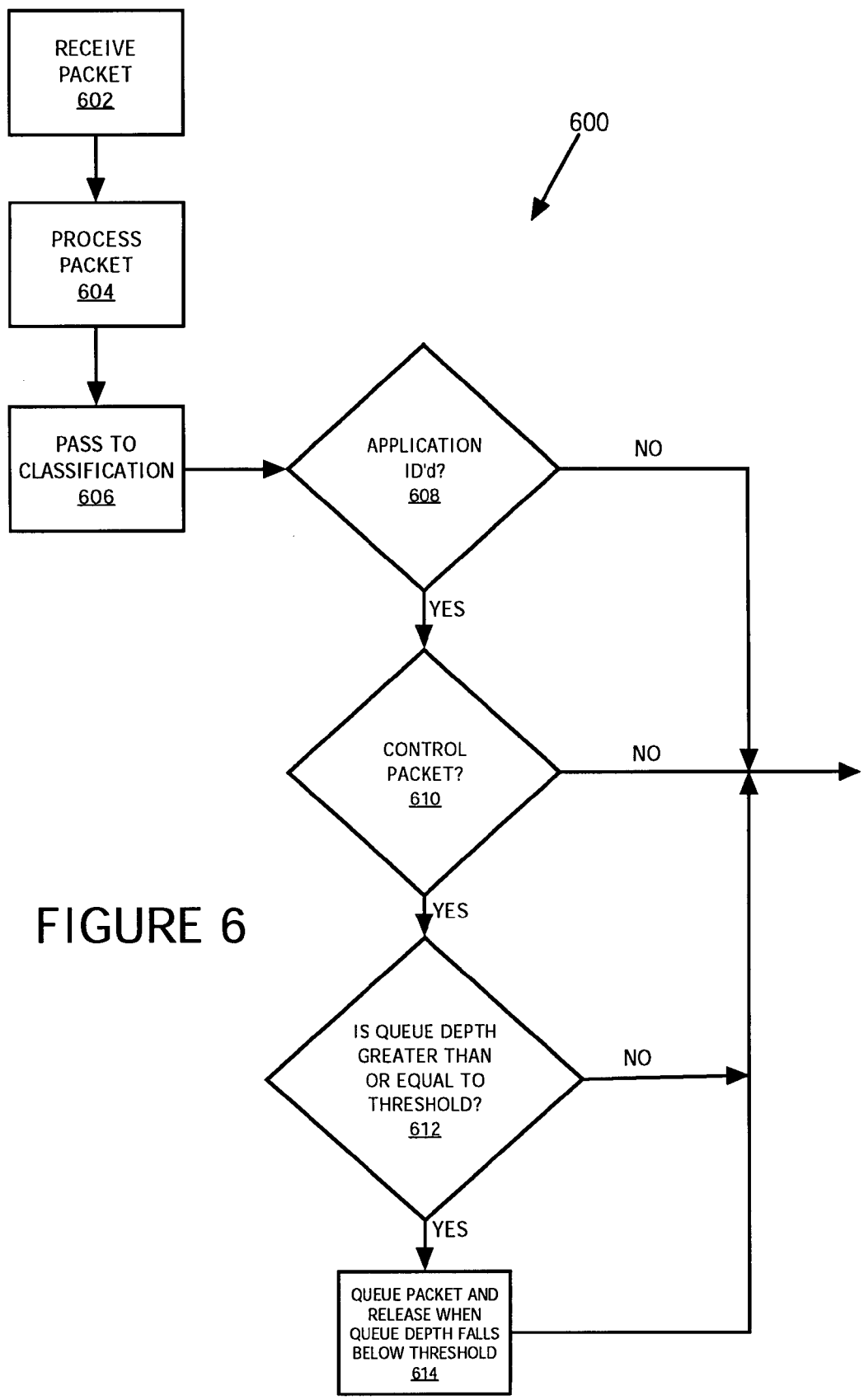
FIG. 6 is a flow chart diagram illustrating an alternative method for inbound rate control, in accordance with an exemplary embodiment.

FIG. 6 is a flow chart diagram illustrating an alternative method 600 for delaying delivery of a packet, in accordance with an exemplary embodiment. Instead of calculating a specific delay for a control packet when the queue depth is above the threshold of the queue 310, application-level rate control module 312 will merely buffer the packet before releasing it to output schedule module 316 when the queue depth of queue 310 falls below the threshold.

To further elaborate, NIC 300 receives a packet (602), forwards it to queue 304 for processing (604) and queue 304 in turn sends it to module 316 (606) for classification. Module 314 determines if the packet corresponds to a network application (608) and further determines if the packet is a control packet (610) in the event that a result of operation 608 is affirmative. If the packet is a control packet (610), then application-level rate control module 312 determines if the queue depth of queue 310 is greater than or equal to the threshold. If no, application-level rate control module 312 forwards the packet for delivery with no delay. Otherwise, module 312 buffers the packet where it will wait until the queue depth of queue 310 falls below the threshold. A separate process of module 312, not shown in FIG. 3, monitors the queue depth of queue 310 and then releases the packet to output scheduler module 316 when the queue depth falls below the threshold.

Advantageously, the claimed embodiments provide for inbound and outbound rate control for network applications and other protocols that do not employ ACKs or other similar flow control mechanisms. In other implementations, the present invention can be utilized to achieve an alternative mechanism for inbound and outbound rate control. By computing a time delay approximately equal for a queue depth of incoming packets to fall below a threshold, outbound packets can effectively be scheduled for delivery in a manner that prevents congestion as a result of delivery of those outbound packets.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for controlling data rate at an application layer, comprising:
   identifying, at a network device, an application-layer message corresponding to a network application, wherein the application-layer message is transmitted in a first direction from a first host to a remote host and is configured to cause the remote host to transmit one or more responsive messages to the first host;
   computing a queuing delay for the application-layer message; and
   delaying transmission of the application-layer message across a link to the remote host according to the queuing delay wherein the computed queuing delay is based at least in part on utilization of the network path segment in a direction opposite the first direction of network traffic corresponding to the network application.

2. An apparatus, comprising
   a memory,
   one or more processors;
   one or more network interfaces;
   network application traffic management logic encoded in one or more tangible media for execution and when executed operable to cause the one or more processors to:
   identify an application-layer message corresponding to a network application, wherein the application-layer message is transmitted in a first direction from a first host to a remote host and is configured to cause the remote host to transmit one or more responsive messages to the first host;
   compute a queuing delay for the application-layer message; and
   delay transmission of the application-layer message across a link to the remote host according to the queuing delay wherein the computed queuing delay is based at least in part on utilization of the link in a direction opposite the first direction of network traffic corresponding to the network application.

3. A method for controlling data rate at an application layer, comprising:
   buffering packets, corresponding to a network application, transmitted in a first direction across a network path segment in an output scheduling data structure;
   identifying an application-layer message corresponding to the network application, transmitted across the network path segment in a second direction opposite the first direction, wherein the application-layer message is transmitted from a first host to a remote host and is configured to cause the remote host to transmit one or more responsive packets to the first host;
   computing a queuing delay for the application-layer message based at least in part on utilization of the network path segment in the first direction by network traffic of the network application; and
   delaying transmission of the application-layer message in the second direction to the remote host according to the queuing delay.

4. The method of claim 3 wherein the computed queuing delay is based on the state of the output scheduling data structure.

5. The method of claim 3 further comprising conditioning the delaying step based on a threshold number of packets buffered in the output scheduling data structure.

6. The method of claim 4 wherein the computed delay is based on an estimation of the amount of time for a number of packets corresponding to the network application buffered in the output scheduling data structure to fall below a threshold level.

7. An apparatus, comprising
   a memory,
   one or more processors;
   one or more network interfaces;
   network application traffic management logic encoded in one or more tangible media for execution and when executed operable to cause the one or more processors to:

buffer packets, corresponding to a network application, transmitted in a first direction across a network path segment in an output scheduling data structure;

identify an application-layer message corresponding to the network application, transmitted across the network path segment in a second direction opposite the first direction, wherein the application-layer message is transmitted from a first host to a remote host and is configured to cause the remote host to transmit one or more responsive packets to the first host;

compute a queuing delay for the application-layer message based at least in part on utilization of the network path segment in the first direction by network traffic of the network application; and delay transmission of the application-layer message in the second direction to the remote host according to the queuing delay.

8. A method for controlling data rate at an application layer, comprising:

buffering packets, corresponding to a network application, transmitted in a first direction across a network path segment in an output scheduling data structure;

identifying an application-layer message corresponding to the network application, transmitted across the network path segment in a second direction opposite the first direction, wherein the application-layer message is transmitted from a first host to a remote host and is configured to cause the remote host to transmit one or more responsive packets to the first host;

identifying the number of packets stored in the output scheduling data structure; and delaying transmission of the application-layer message in the second direction to the remote host if the number of packets, or amount of data of the packets, exceeds a threshold.

9. The method of claim 8 wherein the application-layer message is an application-level request formatted according to a request-response protocol.

* * * * *